US012658839B2

(12) United States Patent
Rashed Mohamed Alabassy et al.

(10) Patent No.: US 12,658,839 B2
(45) Date of Patent: Jun. 16, 2026

(54) CONTROL SCHEME FOR FAULT TOLERANT CONVERTER TOPOLOGY BASED DUAL CHANNEL PERMANENT MAGNET MOTOR DRIVE SYSTEM

(71) Applicant: Goodrich Actuation Systems Limited, Shirley (GB)

(72) Inventors: Mohamed Elsayed Rashed Mohamed Alabassy, Nottingham (GB); Maamar Benarous, Coventry (GB)

(73) Assignee: GOODRICH ACTUATION SYSTEMS LIMITED, Shirley (GB)

( * ) Notice: Subject to any disclaimer, the term of this patent is extended or adjusted under 35 U.S.C. 154(b) by 243 days.

(21) Appl. No.: 18/641,630

(22) Filed: Apr. 22, 2024

(65) Prior Publication Data

US 2024/0356478 A1     Oct. 24, 2024

(30) Foreign Application Priority Data

Apr. 20, 2023    (EP) ..................................... 23169066

(51) Int. Cl.
| | |
|---|---|
| *H02P 29/024* | (2016.01) |
| *H02P 23/14* | (2006.01) |
| *H02P 27/06* | (2006.01) |

(52) U.S. Cl.
CPC ............ *H02P 29/024* (2013.01); *H02P 23/14* (2013.01); *H02P 27/06* (2013.01)

(58) Field of Classification Search
CPC ........ H02P 29/024; H02P 23/14; H02P 27/06; H02P 25/22
See application file for complete search history.

(56) References Cited

U.S. PATENT DOCUMENTS

| | | | |
|---|---|---|---|
| 9,024,564 B2 | 5/2015 | Kinouchi et al. | |
| 9,124,207 B2 | 9/2015 | Hayashi | |
| 9,634,604 B2 | 4/2017 | Von Wendorff | |
| 10,320,183 B2 | 6/2019 | Benarous et al. | |
| 11,095,237 B2 | 8/2021 | Yukawa et al. | |
| 11,456,692 B2* | 9/2022 | Aoki ..................... | H02P 29/028 |
| 2017/0047728 A1 | 2/2017 | Benarous et al. | |
| 2019/0081585 A1* | 3/2019 | Nakamura .............. | H02P 25/22 |
| 2019/0363664 A1* | 11/2019 | Nakamura .............. | H02P 27/06 |
| 2020/0331517 A1* | 10/2020 | Toko ....................... | H02P 27/06 |
| 2023/0095327 A1 | 3/2023 | Alabassy et al. | |

FOREIGN PATENT DOCUMENTS

EP        4160902 A1     4/2023

OTHER PUBLICATIONS

European Search Report for Application No. 23169066.0, mailed Sep. 13, 2023, 7 pages.

* cited by examiner

*Primary Examiner* — Thai T Dinh

(74) *Attorney, Agent, or Firm* — CANTOR COLBURN LLP

(57) ABSTRACT

A control scheme for starting a dual channel permanent magnet motor drive system under a one-switch short circuit (OSSC) fault of one channel. The power inverter topology is selected such that in the event of an OSSC fault affecting a channel, the power inverter is operable to produce intermittent assistive torque using the remaining switches. During start-up, before driving the rotor in continuous rotation, the rotor is moved from its initial angular position to a position where it can provide assistive torque. In this way, the rotor position can be optimised to achieve the benefit of the assistive torque from the faulty channel, thus allowing start-up under overload conditions.

18 Claims, 10 Drawing Sheets

CONTROL SCHEME FOR FAULT TOLERANT CONVERTER TOPOLOGY BASED DUAL CHANNEL PERMANENT MAGNET MOTOR DRIVE SYSTEM

CROSS REFERENCE TO RELATED APPLICATIONS

This application claims priority to European Patent Application No. 23169066.0 filed Apr. 20, 2023, the entire contents of which is incorporated herein by reference.

TECHNICAL FIELD

The technology described herein relates to dual channel permanent magnet motor drive systems, and in particular to providing techniques for operating such systems in the event of a one switch short circuit (OSSC) fault within one of the channels.

BACKGROUND

In aircraft, there is currently a trend towards so-called More Electric Aircraft (MEA) whereby loads such as flight control surfaces, landing gear, actuators, fans, pumps etc. which have traditionally been controlled by hydraulic and mechanical systems are now being designed to be controlled electrically by means of an electric motor. For example, Next Generation High Lift Systems (HLS) are envisaged to be highly flexible, distributed and actively controlled using Electro Mechanical Actuators (EMAs) that are driven by an electric motor drive system.

Typical motor drive systems consist of a simple motor driven by an inverter. Safety critical aerospace applications require a certain number of redundancies designed into the system architecture and this cannot be achieved using a simplex motor drive architecture. These redundancies have thus been provided by multi-channel motor drive designs as shown, for example, in FIG. 1. FIG. 1 shows a dual channel (duplex) three phase motor drive system. Thus, in the duplex permanent magnet motor configuration shown in FIG. 1, there are two segregated windings (such that each winding is driven by a separate inverter). When one of the two inverter of these systems develops a fault, the other inverter can take over and control the motor torque. Other numbers of multiple channels can of course also be used for increased redundancy.

To reduce weight and size, permanent magnet motors are often used since they typically have a higher torque-to-power density ratio in comparison to other motor drive alternatives such as switched reluctance or induction motors. An issue with a permanent magnet motor however is that the magnets cannot be switched off under failure of either the motor or the drive. One of the most severe failures is motor winding, or inverter switch shorting, such as a One Switch Short Circuit (OSSC) fault, wherein the inverter loses control over the motor current. Referring to the known inverter topology shown in FIG. 2, the OSSC fault provides natural short circuit paths to the motor currents via the freewheeling diode associated with the short circuited switch. This fault situation is illustrated in FIG. 3. The uncontrolled motor current waveforms under the OSSC fault may produce unacceptably high torque ripples, drag torque and power losses.

One way to manage an OSSC fault is by applying a three-phase short circuit to the motor terminals, for example as described in United States Patent Application Publication No. 2017/0047728 (assigned to Goodrich Actuation Systems Limited, and the content of which are incorporated herein in its entirety). The short circuit may be applied by switching on either the top or bottom three switches of the converter, such that the three phase short circuit produces a balanced short circuit motor current and ripples-free drag torque. The magnitude of the drag torque therefore decreases with the increase in motor speed.

However, the Applicants have recognised that whilst the technique proposed in United States Patent Application Publication No. 2017/0047728 (Goodrich Actuation Systems Limited) has certain advantages, the short circuit applied to the three phase windings may create additional drag torque for the healthy channel to overcome in addition to the load torque, which means that the converter and the motor are typically oversized for driving the load torque and the drag torque, especially at the starting mode of the motor.

There inventors hereof have therefore recognised that there is a need for improvements in the operation of such systems in the event of such OSSC faults.

SUMMARY

According to a first aspect of the technology described herein there is therefore provided a method of operating an electric motor system. The motor system comprises: a motor that comprises a rotor having a magnet mounted thereto and a stator that comprises one or more motor phase windings connected to a motor drive system for driving rotation of the rotor, wherein the motor drive system comprises two channels, each channel comprising a respective power inverter that can be controlled to provide torque for driving rotation of the rotor, and wherein in the event of a one switch short circuit, "OSSC", fault affecting the power inverter in one of the channels, the power inverter in that channel is operable to produce intermittent assistive torque using the remaining switches. The method includes: when it is determined that one of the channels of the motor drive system has a OSSC fault: during a start-up operation of the motor system, wherein the rotor is to be driven from standstill to a continuous rotation: determining whether or not the initial angular position of the rotor at standstill falls within a range of angles where the channel of the motor drive system that has the OSSC fault can provide assistive torque; and when it is determined that the initial angular position of the rotor does not fall within a range of angles where the channel of the motor drive system that has the OSSC fault can provide assistive torque, moving the rotor so that the angular position of the rotor falls within a range of angles where the channel of the motor drive system that has the OSSC fault can provide assistive torque, and then using both channels to start driving continuous forward rotation of the rotor.

According to a second aspect of the technology described herein there is provided an electric motor system comprising a motor that comprises a rotor having a magnet mounted thereto and a stator that comprises one or more motor phase windings connected to a motor drive system for driving rotation of the rotor, wherein the motor drive system comprises two channels, each channel comprising a respective power inverter that can be controlled to provide torque for driving rotation of the rotor, and wherein in the event of a one switch short circuit, "OSSC", fault affecting the power inverter in one of the channels, the power inverter in that channel is operable to produce intermittent assistive torque using the remaining switches, wherein the electric motor system is configured such that: when it is determined that one of the channels of the motor drive system has a OSSC fault: during a start-up operation of the motor system, wherein the rotor is to be driven from standstill to a continuous rotation: a control circuit for the electric motor system is configured to: determine whether or not the initial angular position of the rotor at standstill falls within a range of angles where the channel of the motor drive system that has the OSSC fault can provide assistive torque; and when it is determined that the initial angular position of the rotor does not fall within a range of angles where the channel of the motor drive system that has the OSSC fault can provide assistive torque, the control circuit is operable to control the motor drive system to move the rotor so that the angular position of the rotor falls within a range of angles where the channel of the motor drive system that has the OSSC fault can provide assistive torque, and then once the rotor is moved to an angular position where the channel of the motor drive system that has the OSSC fault can provide assistive torque, the control circuit then controls the motor drive system to use both channels to start driving continuous forward rotation of the rotor.

Embodiments described herein relate to dual channel permanent magnet motor drive systems. In such systems, the motor comprises a rotor having a magnet mounted thereto and a stator that comprises one or more motor phase windings which are connected to a motor drive system comprising two (or more) channels that each comprise a respective power inverter operable to produce torque to drive continuous forward rotation of the rotor (i.e. to start-up the motor, i.e. to provide the desired motor load).

According to the embodiments described herein the respective inverters are designed such that in the event of an OSSC fault affecting the inverter, the inverter does not produce drag torque, but is still operable to produce assistive torque using the remaining (healthy) switches, at least at certain angular positions of the rotor. That is, and in particular, the inverter in the faulty channel is operable to (and does) produce assistive torque (i.e. torque that drives forward rotation) at certain angular positions, but in embodiments at other angular positions does not produce any torque (i.e. produces zero torque).

Thus, according to the embodiments described herein, the inverter is designed such that, depending on the angular position of the rotor (the rotor angle), the faulty channel may or may not be able to produce assistive torque, but in which the produced torque is always greater than or equal to zero (i.e. is always assistive, and the possibility for drag torque is prevented). In other words, the faulty inverter channel is in embodiments operable to produce an "intermittent" assistive torque as the rotor is rotated.

For example, and in particular embodiments, a power inverter according to the present disclosure comprises a switching circuit, an input circuit and a freewheeling diode bridge arrangement. The switching circuit comprises an upper branch, a lower branch, and a respective switch arm for each phase of the output. Each switch arm extends between the upper and lower branches, and comprises an upper branch switch and a lower branch switch. The upper and lower branch switches are positioned on either (e.g. opposite) side of the switch arm output. The input circuit comprises upper and lower isolating switches that can be selectively operated to respectively isolate the upper and/or lower branches of the switching circuit. The diode bridge arrangement comprises at least one diode bridge arm for each switch arm of the switching circuit, the respective diode bridge arms providing freewheeling paths for the upper and lower branch switches of the respective switch arm to the upper branch of the switching circuit. The diode bridge arm may for instance comprise one or more diodes that allow current to flow to the upper branch (and block current from flowing back to the lower branch). For example, an example of a suitable power inverter topology that may be used according to embodiments is disclosed in European Patent Application No. 4,160,902 (Goodrich Actuation Systems Limited), the content of which are incorporated herein in its entirety.

In such arrangement, the upper and lower isolating switches assist in the control, e.g. isolation, of the upper and lower branch switches of the switch arms. By operating the upper and/or lower isolation switches, the respective upper and/or lower branch switches can be controllably isolated. Thus, the inverter topology of the present disclosure provides an improved means for management of short circuit fault conditions such as OSSC faults. For example, in embodiments, a method may comprise opening one or both of the upper and/or lower isolation switches to isolate the fault. By isolating the fault in this way, motor drag torque that might otherwise result from the faulty channel (e.g. in more conventional inverter arrangements) may be reduced, e.g., and in embodiments, eliminated. Additionally or alternatively, the upper and/or lower isolation switches may be operated, together with the other healthy switches, to provide continued useful output, i.e. "assistive" torque.

For example, when one of the inverter switches fails, the inverter may still be used to produce some useful output by repeatedly switching at least one of the upper and/or lower isolation switches on and off over successive periods to thereby provide the required switching function. With this topology, the inverter may thus be tolerant of such OSSC faults, and still operable to produce intermittent assistive torque in the manner described above (without producing drag torque).

The technology described herein thus particularly relates to dual channel permanent magnet motor drive system in which the channels include such inverters having a OSSC fault tolerant topology (e.g., and in embodiment, a topology as described in European Patent Application No. 4,160,902 (Goodrich Actuation Systems Limited)) and which are therefore operable to produce intermittent assistive torque in the event of an OSSC fault. However other suitable arrangements would be possible so long as the inverter topology is capable of producing intermittent assistive torque in this manner.

More particularly, the technology described herein provides a novel control scheme for starting such dual channel permanent magnet motor drive systems under OSSC faults affecting at least one of the channels (i.e. such that there is at least one 'faulty' channel).

In particular, when it is desired to start up the rotor from standstill, and when at least one of the channels is experiencing an OSSC fault, it is first determined whether the angular position of the rotor in its initial state, i.e. at standstill, falls within a range of angles where the at least one channel of the motor drive system that has the OSSC fault does not provide any assistive torque. If so, before attempting to start driving the rotor in continuous rotation according to the desired motor operation (i.e. to provide the desired motor loads), the rotor is initially moved to a different angular position that falls within the range of angles where the at least one channel of the motor drive system that has the OSSC fault can provide assistive torque. Once the rotor is moved to the desired angular position at which the inverter in the faulty channel can produce assistive torque, the motor drive system then uses both channels (i.e. including the faulty channel(s)) to start driving continuous rotation of the rotor.

On the other hand if the angular position of the rotor already falls within the range of angles where the at least one channel of the motor drive system that has the OSSC fault can provide assistive torque, the motor drive system can simply use both channels to start driving continuous rotation of the rotor from the initial angular position without having to first move the rotor to a desired starting position (and so in embodiments this is done). In some embodiments, the method comprises moving the rotor so that the angular position of the rotor is moved to the start of a range of angles where the channel of the motor drive system that has the OSSC fault can provide assistive torque before using both channels to start driving continuous forward rotation of the rotor and the control circuit is configured accordingly). This can then provide a more optimal operation as the faulty channel can provide maximum assistance (i.e. a longer duration of assistive torque) during the start-up operation.

This then has the effect and benefit that both channels can be used to produce assistive torque during the initial start-up operation, thus helping overcome any inertia and/or overload associated with initiating rotation of the motor. This in turn means that the motor drive system is operable to start up the motor even under overload conditions without having to oversize the channels to cope with possible OSSC faults. Considered another way, the technology described herein allows the power inverters in both channels to be reduced in size since it is now possible to start up the motor using both channels, even when one of the channels experiences an OSSC fault.

For instance, in order to start up the motor under normal operation conditions, without any OSSC fault, the motor drive system may be required to provide a first, nominal torque, and in embodiments each channel of the motor drive system is sized and arranged to provide less than the first, nominal torque. For example, each channel of the motor drive system may be sized and arranged to provide between 50-80% of the first, nominal torque that is required in order to start up the motor system under normal operation conditions.

The technology described herein may thus provide various benefits compared to other possible approaches.

According to the technology described herein it is necessary to determine whether or not the initial angular position of the rotor falls within a range of angles where the faulty channel can provide assistive torque. In general, the range of angles where the faulty channel can provide assistive torque (and hence the range of angles where the faulty channel does not provide assistive torque) will depend on the inverter topology and the nature of the fault, in particular, depending on which of the switches has failed. Thus, the respective ranges of angles can be determined in advance by suitable characterisation of the system and then stored for future use in the event that an OSSC fault is encountered. In particular, when an OSSC fault is encountered, a controller may look up the appropriate range of angles for that fault and then determine whether or not the current (initial) angular position of the rotor falls within a range of angles where the faulty channel can provide assistive torque.

It will be appreciated that the current (initial) angular position of the rotor can be determined in any suitable and desired manner. For example, an angular position sensor such as an encoder or resolver may be used to do this, in the normal manner for such systems.

As mentioned above, when the current (initial) angular position of the rotor does not fall within a range of angles where the faulty channel can provide assistive torque, the rotor should then be (and is) rotated to a different angle. In embodiments, this is done by rotating the rotor backwards from its initial angular position (i.e. in the opposite direction to the forward direction in which the motor is driven in normal use). For example, the rotor may, and typically will, be driven in continuous forward rotation in a clockwise sense (when viewed from the load side), whereas the initial movement of the rotor may comprise rotating the rotor in an anticlockwise sense.

This initial backward rotation can be performed either using the healthy channel (if one is available) or using the faulty channel or using both channels (the healthy and the faulty channels). In this respect it will be appreciated that the initial backward rotation can therefore be performed using only one channel, or using a faulty channel or both (in contrast to the actual starting of the motor which may require both channels to overcome inertial and overload effects and to drive continuous rotation of the rotor).

Once the motor has been started, the motor can then be controlled in any suitable manner as desired. For example, in embodiments, once the motor has reached a certain threshold speed, the motor control can then be switched to a different control mode.

For example, in embodiments, after the start-up operation, once the rotor is continuously rotating at a certain threshold speed, so long as the motor load is less than the nominal torque of the healthy channel, the continued rotation of the rotor is controlled using the healthy channel only, with an open circuit applied to the inverter of the faulty channel.

However, in the event of overload, the faulty channel can then be operated again to provide assistance. Thus, in embodiments, once the rotor is continuously rotating at a certain threshold speed, when the motor load is greater than the nominal torque of the healthy channel, the continued rotation of the rotor is controlled using both the healthy channel and the faulty channel, with the faulty channel being operated to provide intermittent assistive torque.

Various other arrangements would however be possible for controlling the electric motor system after the start-up cycle is complete and the technology described herein particularly relates to the operation during the start-up cycle.

The control circuit (circuitry) for the electric motor system may be implemented in any suitable manner, as desired. For example, this may be implemented either in hardware or software (including embedded software), as desired, using any suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

The methods in accordance with the technology described herein may thus be implemented at least partially using software e.g. embedded software. The controller may thus comprise a suitable microprocessor or microcontroller that is configured to execute software to perform the various operations described herein.

It will thus be seen that when viewed from further embodiments the technology described herein provides software specifically adapted to carry out the methods herein described when installed on a suitable data processor, a computer program element comprising software code portions for performing the methods herein described when the program element is run on a data processor, and a computer program comprising code adapted to perform all the steps of a method or of the methods herein described when the program is run on a data processing system.

Other arrangements would however be possible. For instance, the methods may also be implemented at least partially using appropriately dedicated hardware elements (processing circuitry) and/or programmable hardware elements (processing circuitry, e.g. such as a programmable FPGA (Field Programmable Gate Array)) that form part of the motor controller and can be programmed to operate in the desired manner. It would also be possible to implement the methods described above using analogue logic, for example.

Subject to the requirements of the technology described herein, the motor system may otherwise comprise any suitable and desired features that a permanent magnet motor system may comprise.

In that respect, it will be appreciated that whilst reference is made herein to a dual channel permanent magnet motor system, it will be appreciated that "dual" in this context is intended to mean a system having two or more channels, and that there may in general be any suitable number of channels provided, and that these further channels can be operated in the same manner described above.

Various other arrangements would of course be possible.

BRIEF DESCRIPTION OF DRAWINGS

Various embodiments will now be described, by way of example only, with reference to the drawings.

Like reference numerals are used for like components where appropriate in the Figures.

DETAILED DESCRIPTION

As briefly described above, FIG. 1 shows an example motor drive for a permanent magnetic motor 108. In the system 100 of FIG. 1, the duplex permanent magnet motor comprises two segregated windings, with each winding being driven by a respective, separate channel. The system controller 102 is therefore operably connected to the permanent magnetic motor 108 via two channels 104, 106, each channel comprising a respective inverter circuit 104*a*, 106*a* that provides one or more phases of AC output to its respective motor winding. The use of two separate inverters 104*a*, 106*a* each corresponding to one of the channels 104, 106 provides redundancy in the system, as the second inverter (e.g. 106*a*) is able to take over and control the motor torque in the event that the first inverter (e.g. 104*a*) develops a fault. This duplex arrangement is therefore particularly suitable for safety critical applications such as for driving electric motors within aircrafts, such as for High Lift Systems. However, different numbers of channels and inverters may of course be used, as desired.

Figure 1:
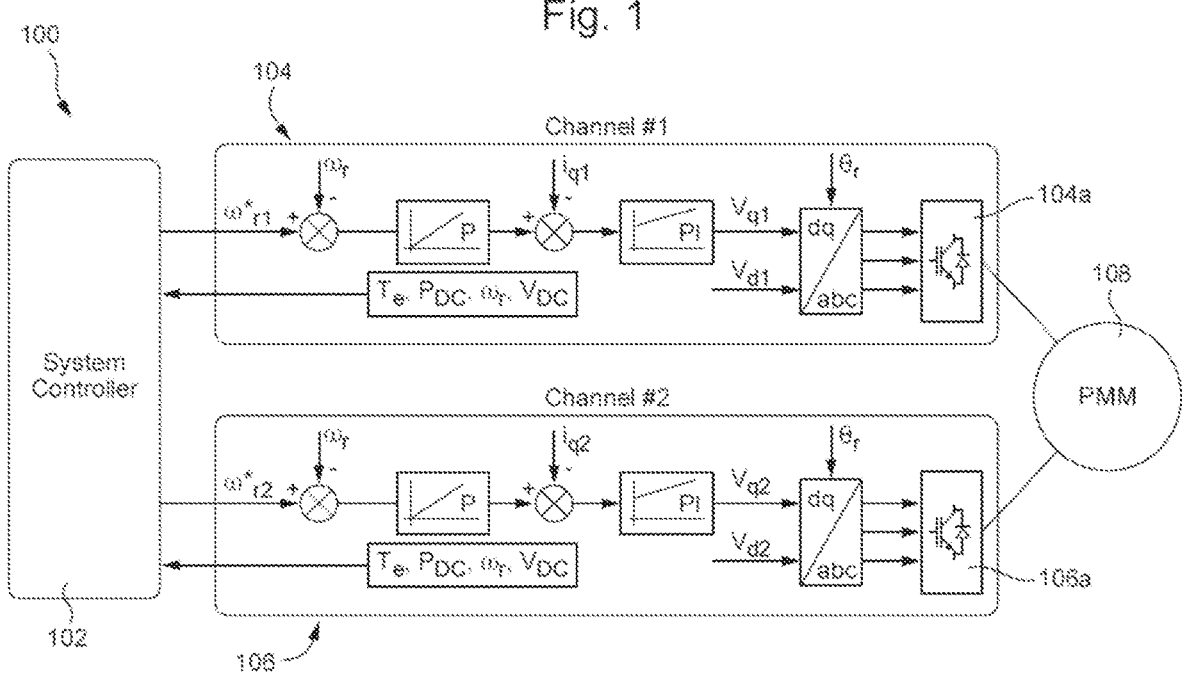
FIG. 1 is a schematic diagram of an example of a duplex permanent magnet motor drive system.
Figures 2, 3:
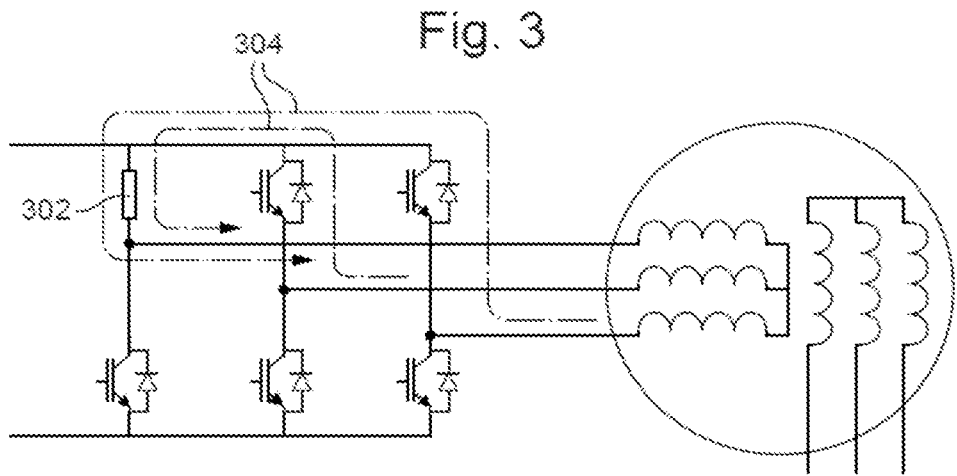
FIG. 2 is a schematic diagram showing an example of an existing two-level three-phase inverter topology.
FIG. 3 is a schematic diagram showing an example OSSC fault in the inverter topology of FIG. 2.

FIG. 2 shows an example of a more conventional two-level three-phase inverter circuit 200 that could be used for the respective channels of the system 100 of FIG. 1. Thus, as shown in FIG. 2, the inverter output is operably connected to the windings 202*a* of the first channel which are wound about a permanent magnetic motor 108. Although not shown in FIG. 2, it will be understood that a second equivalent inverter system will be provided for the windings 202*b* of the second channel.

The inverter circuit 200 in FIG. 2 comprises six switches, including three top switches 204*a,b,c* and three bottom switches 206*a,b,c*. Each switch 204/206 is connected in parallel with a respective freewheeling diode 208. Under normal operating conditions, the switches are operable to control the inverter output, e.g. in the normal manner for a switching inverter.

FIG. 3 shows schematically the current flow in the inverter circuit 200 of FIG. 2 in the event of an OSSC fault. In this example, a short circuit 302 has occurred at top switch 204*a*. As a result, currents 304 flow via the short-circuited path 302. The resulting waveforms from the flow of currents 304 will produce torque ripples and power losses in the motor, as well as drag torque. The inverter is thus no longer able to control the motor current.

An inverter topology according to an embodiment will now be described that provides a means to more effectively manage OSSC and other short circuit fault conditions. As will be described below, in various operation modes the OSSC fault tolerant ("OSSCFT") inverter topology of the present embodiment may substantially eliminate motor drag torque and/or allow the channel experiencing the OSSC fault to still produce at least some useful torque in order to assist the healthy channel.

Figure 4:
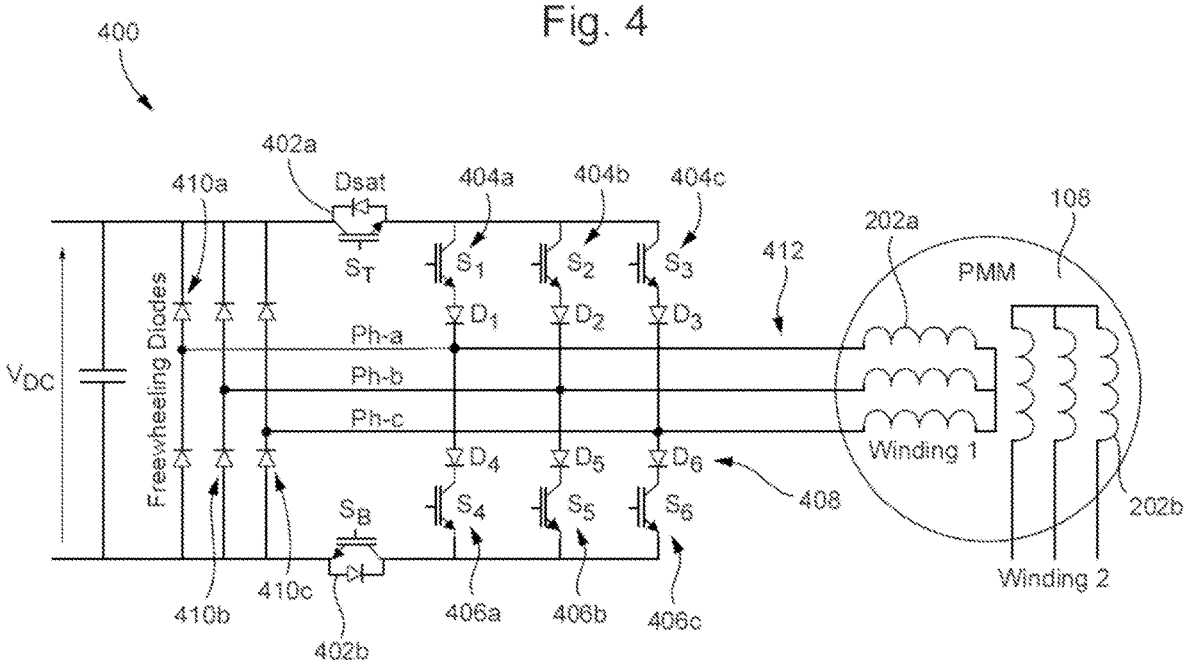
FIG. 4 is a schematic diagram of a OSSC fault tolerant converter topology that may be used within the channels of a duplex permanent magnet motor drive system according to an embodiment.

FIG. 4 shows an example of a channel for a permanent magnet motor drive system including a two-level three-phase inverter having an OSSCFT topology in accordance with an embodiment. It will be understood that the permanent magnetic motor drive system may further comprise one or more additional channels, each of which may comprise their own (corresponding) inverter circuits, e.g. as shown in FIG. 1. These additional inverter circuits may each, and in the present embodiment do, have the same topology as inverter 400.

The inverter 400 comprises a switching circuit including three switch arms extending between upper and lower DC buses (generally, upper and lower 'branches') of the switching circuit, each switch arm providing a respective AC output phase.

Figure 9:
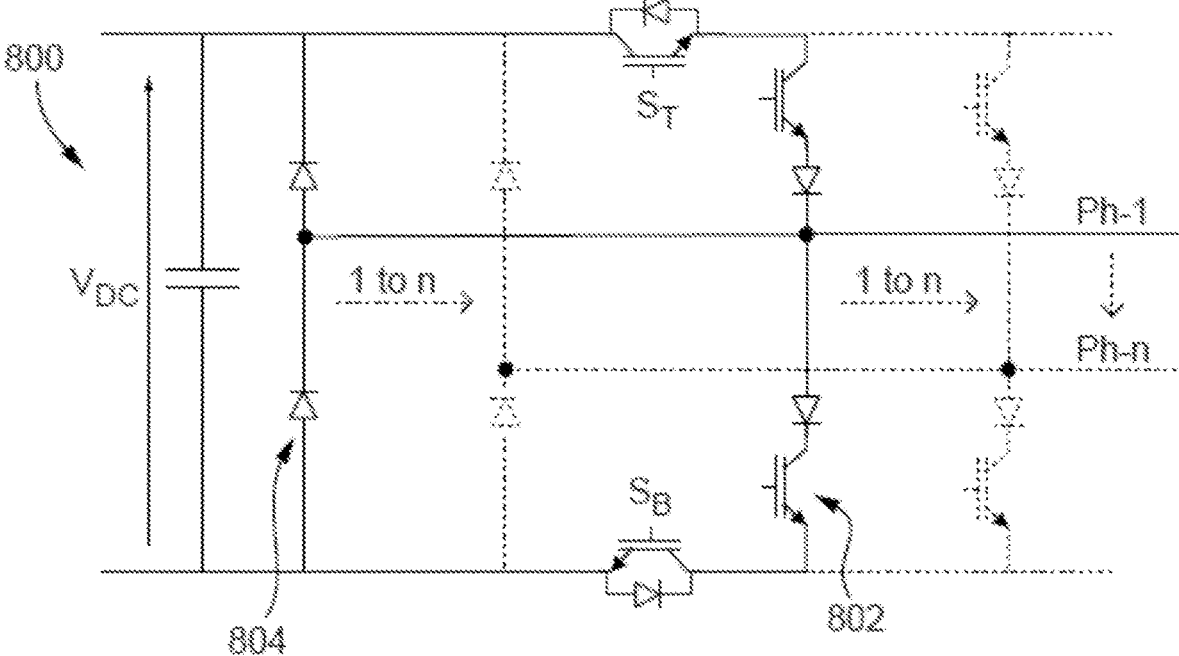
FIG. 9 is a schematic diagram showing an example of a generalised n-phase inverter topology according to an embodiment.

It will be understood that the number of switch arms in the inverter 400 correlates with the number of desired output phases (i.e. three, in this example), and that the inverter may comprise a different number of switch arms if desired, including but not limited to 1, 2, 3, 4 or more switch arms corresponding to respective single-, two-, three-, four-, etc. phase output topologies. For instance, a generalised n-phase inverter topology is shown in FIG. 9. FIG. 9 shows a schematic of a generalised n-phase inverter topology 800 according to an embodiment. Inverter circuit 800 comprises n switch arms 802 and n corresponding diode bridge arms 804 collectively forming an n-phase freewheeling diode bridge arrangement.

Each switch arm of inverter 400 comprises two switches, including an upper branch switch 404a,b,c and a lower branch switch 406a,b,c. The upper branch 404 and lower branch 406 switches are paired along respective their switch arms on different sides of the respective switch arm output 412. In inverter 400, each switch 404, 406 is paired in series with a reverse current blocking diode 408 to inhibit current flow in an undesired direction. Other arrangements would of course be possible. For example, some unidirectional switches, such as a Gate Turn-Off Thyristor (GTO) type switch, are operable to withstand a sufficient reverse voltage. As such, diodes 408 are not strictly essential.

The switches in the switching circuit may be designed in any suitable and desired way. For instance, in embodiments, the switches 404, 406 may comprise IGBT, MOSFET or GTO type switches. However, other arrangements would of course be possible. The switches 404, 406 are, in normal operation, controlled to generate the desired AC output phases. Thus, in normal (healthy) operation of the inverter, a DC voltage is applied across the upper and lower branches and the switching circuit is operated to convert the input DC voltage to one or more AC phases, e.g. in the normal manner for a switching inverter.

Thus, in normal (healthy) operation, the inverter according to the FIG. 4 embodiment acts similarly to the more conventional inverter that is shown in FIG. 2. However, and as will be explained further below, the inverter according to the present operation is able to better handle short circuit faults such as OSSC faults.

To facilitate this, in addition to the various switches 404, 406 within the switching circuit, the inverter 400 according to the present embodiment further comprises upper and lower isolation switches, 402a,b that are selectively operable to respectively isolate the upper and lower branches of the switching circuit. As such, the upper branch isolation switch 402a is operable to isolate all of the upper branch switches 404a,b,c for the switch arms, and the lower branch isolation switch 402b is correspondingly operable to isolate all of the lower branch switches 406a,b,c. The isolation switches 402a,b in embodiments are thus configured to act as Solid State Circuit Breakers. In embodiments, the isolation switches 402a,b are current overrated with wide safe operating area compared to the switches 404,406 of the switching circuit.

A controller for the system that the inverter is part of is thus operable to detect a short circuit of either the switch or the switch and the associate reverse blocking diode, such as OSSC faults, and in response to this, control the isolation switches 402a,b appropriately. Various examples of the OSSC fault management will be described further below.

In order to provide freewheeling paths to the upper branch (DC bus), the inverter further comprises, for each switch arm (phase), a respective diode bridge arm, such that the freewheeling diode bridge arms collectively form a freewheeling diode bridge. Thus, as shown in FIG. 4, each winding phase of the motor is operably connected to the inverter 400 via a respective switch arm and a respective freewheeling diode bridge arm 410a,b,c. In particular, in FIG. 4, the upper and lower branch switches of each switch arm (e.g. switch pairs 404a and 406a, 404b and 406b, etc.) share a corresponding freewheeling diode bridge arm (e.g. 410a, 410b, etc.). Thus, FIG. 4 shows a three-phase diode bridge arrangement, with each output phase (switch arm) having its own diode bridge arm providing a respective freewheeling path to the upper branch. Note that the diode bridge arms are connected to the upper branch upstream of the isolation switches so that when the isolation switches are open, the freewheeling current cannot flow back into the motor windings. Although in FIG. 4 each switch arm has a single corresponding diode bridge arm this is not strictly necessary and, for instance, each of the switches 404a, 404b, 406a, etc. could have its own diode bridge arm, so long as these provide suitable freewheeling paths to the upper branch for each of the switches.

That is, however the freewheeling paths are arranged, all of the switches should have a freewheeling path (directly) to the upper branch, and upstream of the isolation switch. This helps to ensure that in the event of switch failure the freewheeling current can be handled appropriately, without generating motor drag. This is contrast to the more conventional arrangement shown in FIG. 2 where each switch has its own parallel freewheeling diode, which can lead to the issues illustrated in FIG. 3.

As shown in FIG. 4, the upper branch isolation switch 402a may be associated with a desaturation protection (Dsat) circuit. Alternatively/additionally, this could be provided on the lower branch isolation switch 402b. However, it is a benefit of the present embodiment that only a single desaturation protection circuit is required in order to be able detect the shoot-through current, in comparison to at least three such circuits (e.g. on at least one switch of each switch arm) that may be required in a topology without isolation switches 402a,b, such as that shown in FIG. 2. Thus, the switches 404,406 within the switching circuit can be protected only by the desaturation protection circuit associated with the isolation switch, and do not require their own, respective desaturation protection (and so in embodiments these are not provided).

A suitable two-level three-phase inverter topology that may desirably be used according to embodiments may thus generally be comprised of the following components:

Six discrete switches, (S1, S2, S3, S4, S5, S6). These may be unidirectional switches. As mentioned above, the switches may be based on either IGBT, MOSFET or GTO technologies. Other examples would however be possible.

Optionally six reverse blocking discrete diodes, (D1, D2, D3, D4, D5, D6) connected in series with the above-mentioned switches.

Two DC bus isolation switches, ST and SB, acting as Solid State Circuit Breaker (SSCB).

Respective diode bridge arms, for each switch arm (for each phase), that provide the freewheeling paths to the upper branch of the inverter.

A desaturation (Dsat) protection circuit associated with one of the isolation switches and arranged for detecting the shoot through current.

Further details of this arrangement may be found in European Patent Application No. 4,160,902 (Goodrich Actuation Systems Limited), the content of which is incorporated herein in its entirety, and the power inverter topology that is used according to embodiments may therefore generally correspond to that described in such document, and may accordingly include any features described in that document.

Other arrangements would however be possible and subject to the particular requirements of the technology described herein the inverter may in general comprise any other suitable and desired components or arrangement of components.

Referring then to FIG. 4, under normal (active) operation conditions, the isolation switches 402a,b may generally be maintained in an always on state and as a result the inverter 400 may operate substantially in line with conventional two-level voltage source inverters.

However, in the event of a failure of one or more of the upper branch switches 404a,b,c and/or the associated reverse blocking diode resulting in either a unidirectional or bidirectional short circuit fault across the respective switch (e.g. an OSSC fault), the fault may be isolated and/or managed using the upper branch isolation switch 402a. Thus, in case, one of the upper branch switches fails, it may be sufficient to switch off the upper branch isolation switch to isolate and manage the fault. Similarly, a fault resulting from a failure of one or more of the lower branch switches 406a,b,c and/or the associated reverse blocking diode may be isolated and/or managed using the lower branch isolation switch 402b.

Moreover, in the event of a short circuit fault of any of switches 404, 406 and/or associated reverse blocking diodes (such as an OSSC fault), the presence of the isolation switches means that the OSSCFT inverter 400 according to the present embodiment is also still able to produce useful output for (assisting) motoring by controlling the remaining (operational) switches and isolation switches 402a,b. That is to say that, in contrast to existing motor inverter topologies, a faulty OSSCFT inverter 400 can be operated such that it continues producing useful motoring torque, and as a result the overall size of the motor drive system can be reduced. For instance, the isolation switches can be switched on and off in order to provide some useful, "assistive" output torque.

Indeed, a benefit of the inverter topology shown in FIG. 4, and that may be used within the respective inverter channels according to the present embodiment, is that the inverter can then be operated in various different fault management modes using the isolation switches. That is, the inverter topology shown in FIG. 4 allows for various novel operation modes that can provide improved performance in the event of an OSSC fault.

The inverter topology shown in FIG. 4 is therefore particularly suitable for improving reliability of PMM drive systems.

The technology described herein in particular relates to the start-up operation in the situation in which an OSSC fault is experienced in one of the inverter channels. It will be appreciated that due to inertial effects and overload condition, there is a temporary requirement at start-up for higher torque. In traditional inverter systems, like that shown in FIG. 2, there is a further problem that when one channel is experiencing an OSSC fault, that channel will produce significant "drag" torque, which must also be overcome in order to start the motor.

One approach to address this would therefore be to oversize the motor drive system such that even in the event of an OSSC fault, the motor drive system is still capable of starting the motor. However, this necessarily increases the weight and size of the motor drive system, which may be less desirable, especially for aerospace applications.

Another approach would be to simply isolate the faulty channel. For instance, it will be appreciated from the above that because the inverter topology shown in FIG. 4 allows the faulty channel to be disconnected, this can then avoid the problem of any drag torque being introduced under OSSC fault condition. In that case, the motor drive system does not need to be significantly oversized, and it would only be needed to ensure that either channel can start the motor by itself.

The inventors however have recognised that with the inverter topology shown in FIG. 4 the faulty channel can also be controlled to produce assistive motoring power/torque while under OSSC fault and that this can therefore be used during the starting phase of the motor to provide a more efficient start-up operation, or also under overload condition, for example, where additional motoring power/torque may be desired.

Figure 5:
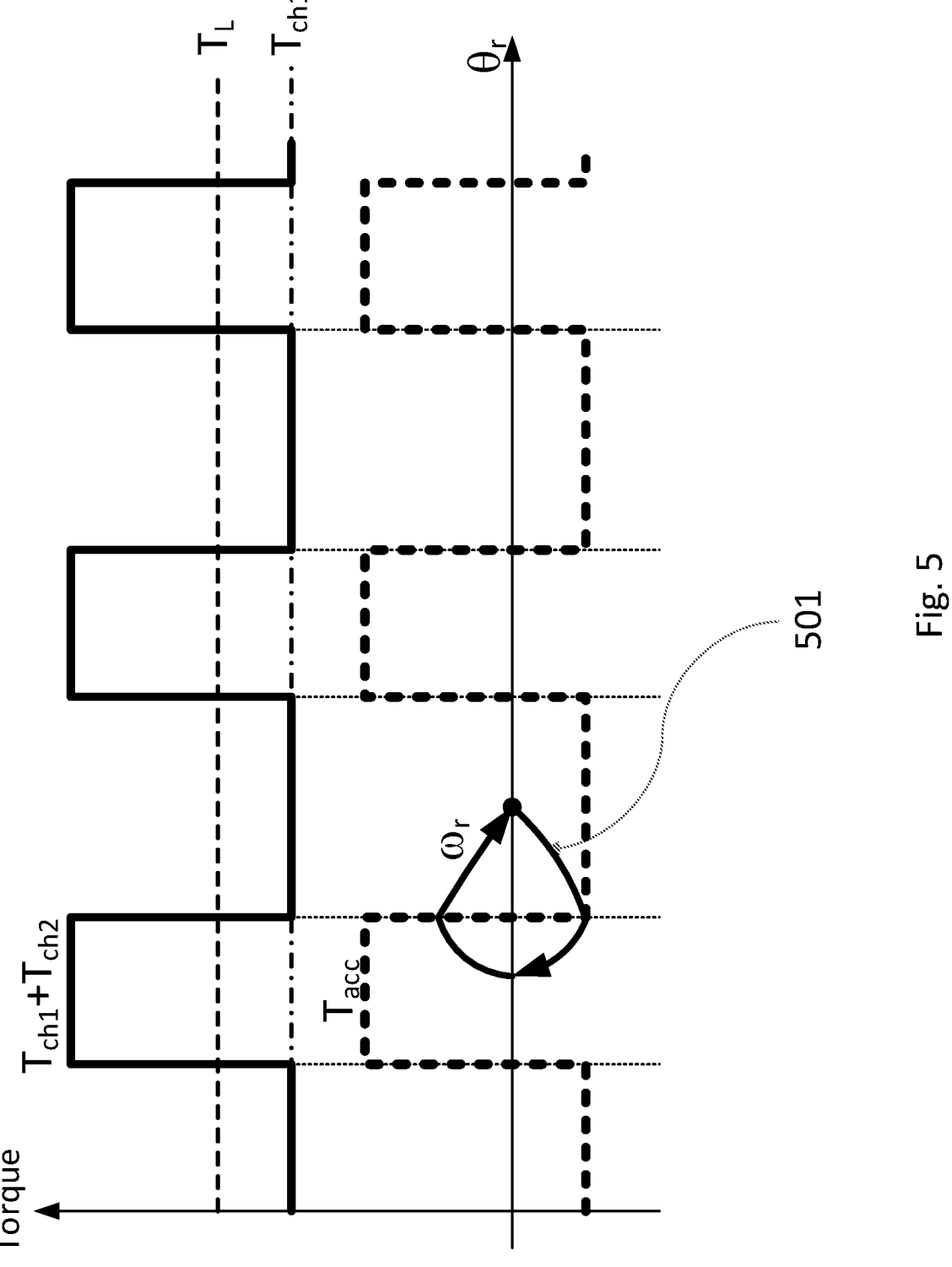
FIG. 5 illustrates the potential problem when attempting to start up a duplex permanent magnet motor drive system from an arbitrary position in the event that one of the channels experiences a OSSC fault.

For instance, as shown in FIG. 5, the faulty channel can be controlled to produce a pulsating torque in the form of a square waveform, which in particular embodiments has a duty cycle of about 42% and which generates a pulsating torque with an average value of about 40% of the nominal design torque of that faulty channel. Thus, in the event of an OSSC fault, the OSSCFT inverter faulty channel produces intermittent aiding torque with respect to the motor rotor position. In particular, for approximately half of the rotor position cycle, the OSSCFT inverter can produce instantaneous assistive torque equal to 100% of the nominal torque of the channel, while for the remaining half of the rotor cycle, the OSSCFT inverter can controlled to produce no torque. This is shown in the upper trace of FIG. 5 which illustrates the load torque (TL), the health channel torque (Tch1) and the sum of the of faulty and healthy channels torque (Tch1+Tch2). The lower trace in FIG. 5 then shows the variation in the total acceleration torque (Tacc) as a function of angular position (θr).

However, the inventors have recognised that when using both channels in this way, with the healthy channel being configured to, and operable to, produce only about 70% of the nominal load torque, there is then a risk when attempting to start up the motor from a random position that the motor may fail to start. In particular, under the condition that the motor is started at an arbitrary rotor position that corresponds to an angular position where the faulty channel produces no assistive torque, such that the torque in initially provided only by the healthy channel, which is only about 70% of the nominal load torque, there may not then be enough torque to overcome inertial effects and/or motor overload. This is illustrated in FIG. 5 where the motor starting speed trajectory 501 under such conditions is shown. In this condition, the motor fails to accelerate the load such that the rotor oscillates (backward and forth) and the motor fails to start.

The technology described herein therefore proposes a novel control strategy for starting the motor under an OSSC fault of an OSSCFT inverter that is able to address this problem and ensure that the motor can be effectively started even when the healthy channel is undersized relative to the nominal torque load or wherein the load is higher than the nominal torque load.

Figure 6:
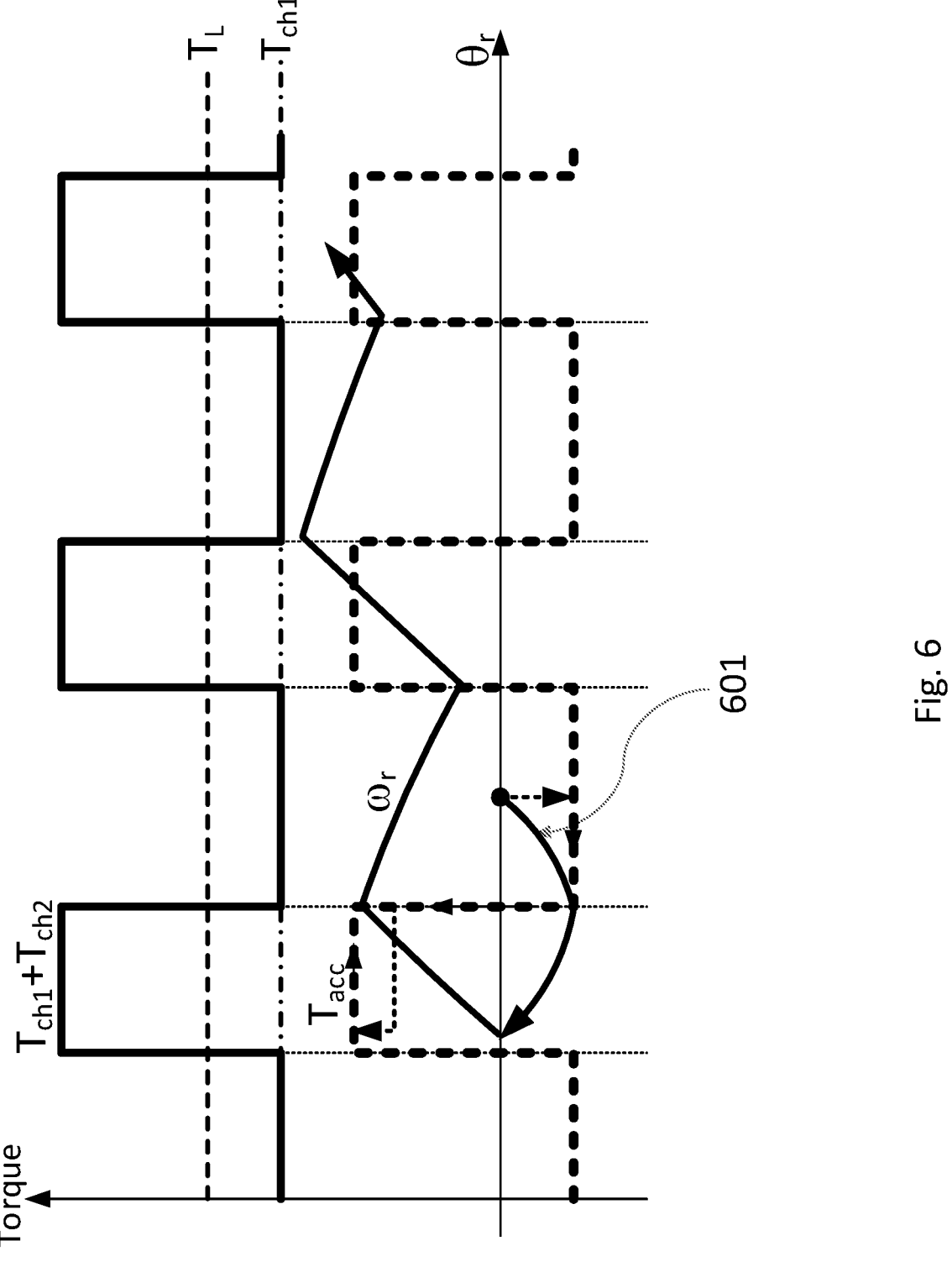
FIG. 6 illustrates a novel control scheme for starting a duplex permanent magnet motor drive system from an arbitrary position in the event that one of the channels experiences a OSSC fault according to an embodiment.

The illustrative drawing in FIG. 6 shows the proposed control strategy for starting the motor under an OSSC fault of one of an OSSCFT inverters channels when the healthy channel is operated/designed for only about 70% of the load torque and the rotors initial position corresponds to one where the faulty channel produces no assistive torque.

Trajectory 601 shows an exemplary evolution (acceleration) of the motor speed when making use of the technology described herein. The rotor is (first) controlled to retreat to a new position under the control of the healthy channel, the load torque and optionally also the faulty channel, wherein the new position is one where the faulty channel is capable of producing assistive torque. In embodiments, this is done under the control of the healthy channel and the faulty channel to produce back driving torque. Subsequently, both the healthy and the faulty channels are controlled to produce instantaneous torque, in embodiments both channels are controlled to the nominal torque, to achieve fast acceleration of motor speed.

Hence, in the event of an OSSC fault, the healthy channel(s) with the help of the faulty channel means that the motor can generally be controlled to start the motor even in the event of a significant overload compared to the nominal load torque. Considered another way, the technology described herein allows the inverters to be reduced in size whilst still ensuring that the motor can be effectively started in the event of one channel experiencing a OSSC fault.

The proposed starting strategy of the motor under an OSSC fault of an OSSCFT inverter channel is validated by simulation. The simulation results are obtained for a generic motor, with generic parameters, and with the following operation assumptions:

The motor phase currents are controlled using simple but fast hysteresis current controllers.

The DC bus voltage is constant and equal to 540V.

The motor is a sinusoidal back-emf type motor.

Figure 7A:
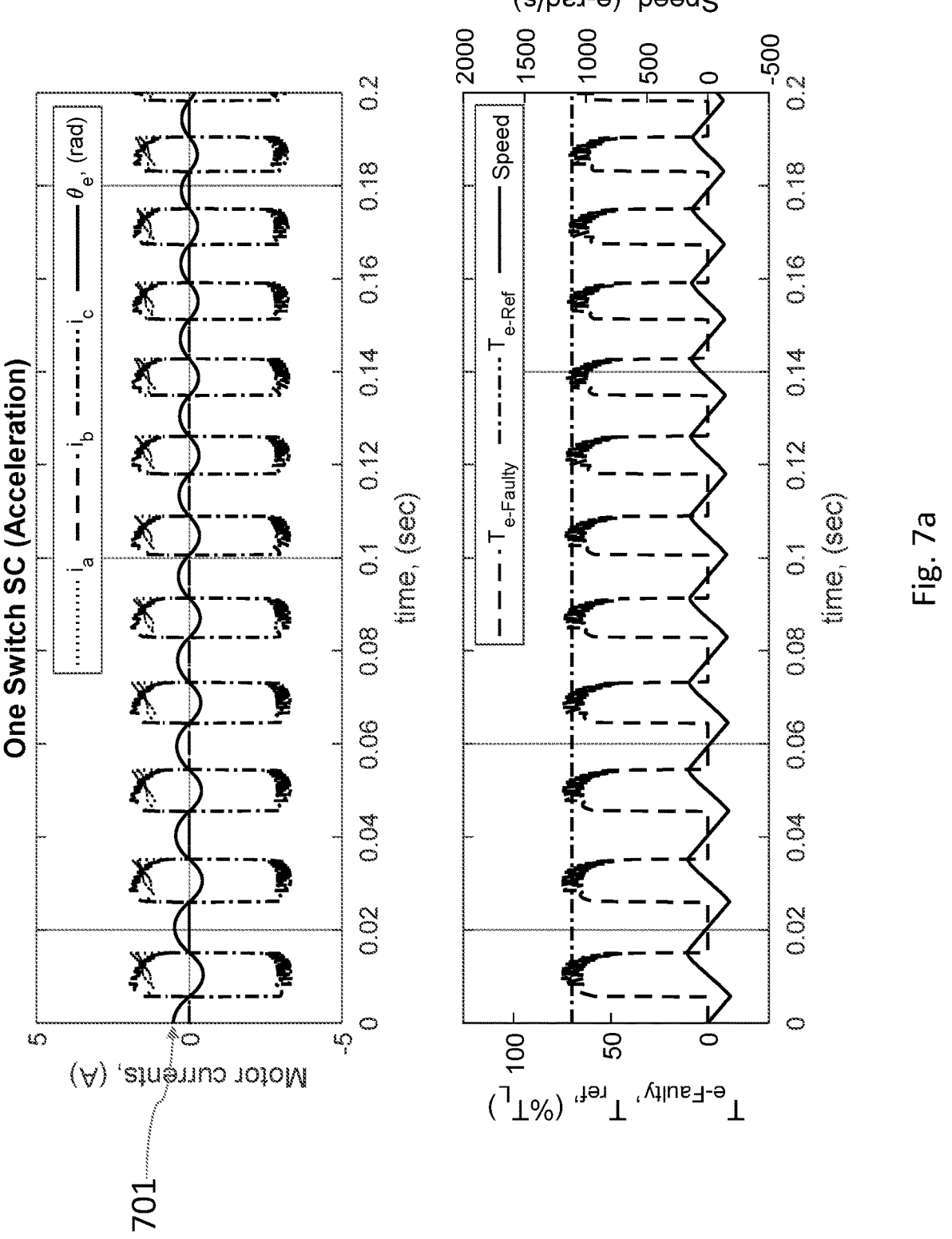
FIG. 7*a*-7*b* show simulated results of the faulty channel control in the case of attempting to start the motor from a random position not employing the control scheme of the technology described herein.
Figure 7B:
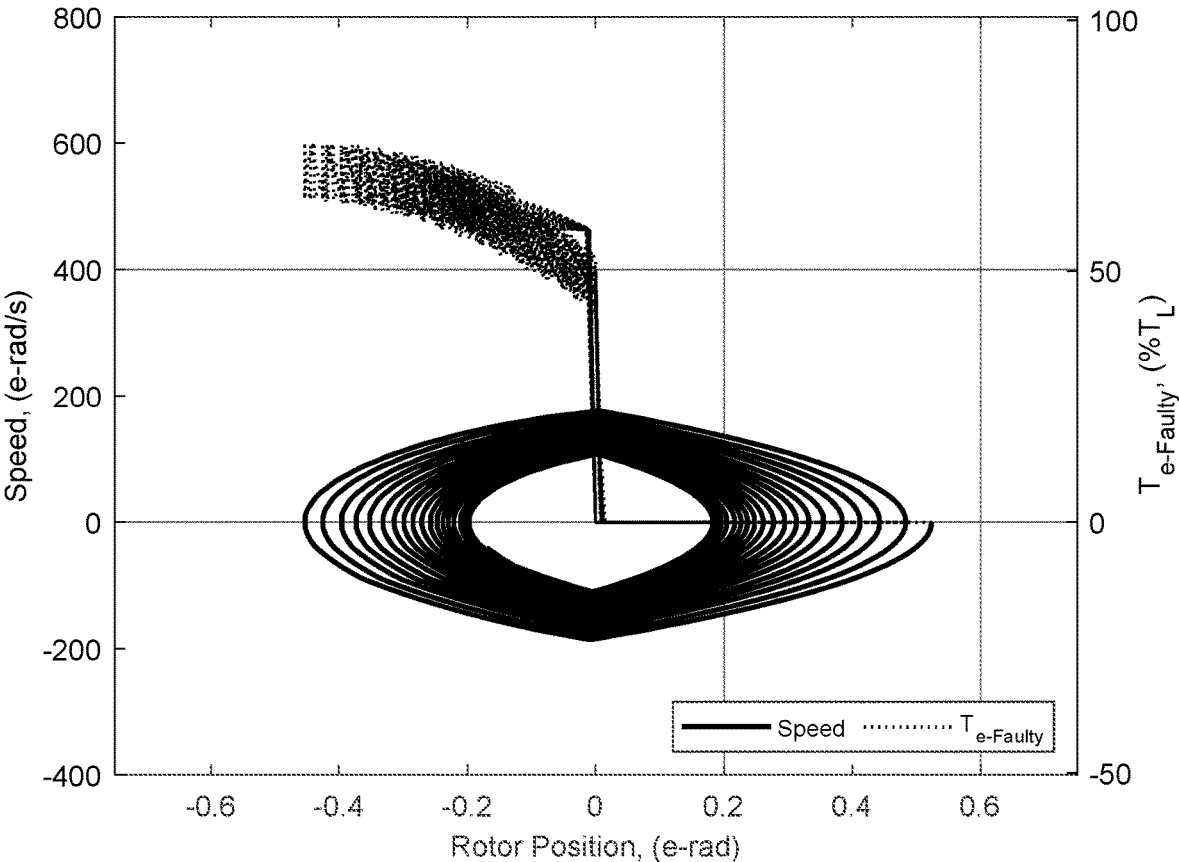

The simulation results shown in FIG. 7a-7b illustrate the problem described above in relation to FIG. 5. In this example, the initial rotor position of the motor was simulated to start at 0.55 rad, as shown by curve 701 in FIG. 7a, at this rotor position the faulty channel produces no torque. The two inverters, the healthy and the faulty inverters are controlled to produce the nominal torque, which is about 70% of the load torque. The upper panel in FIG. 7a thus shows the three-phase motor currents and the lower panel in FIG. 7a shows the respective torques produced by the faulty channel and the healthy channel, as well as the motor speed. It can be seen from FIG. 7a that the motor fails to start. This is further illustrated in FIG. 7b where it can be seen that the rotor oscillates and does not accelerate to the desired operating speed.

Figure 8A:
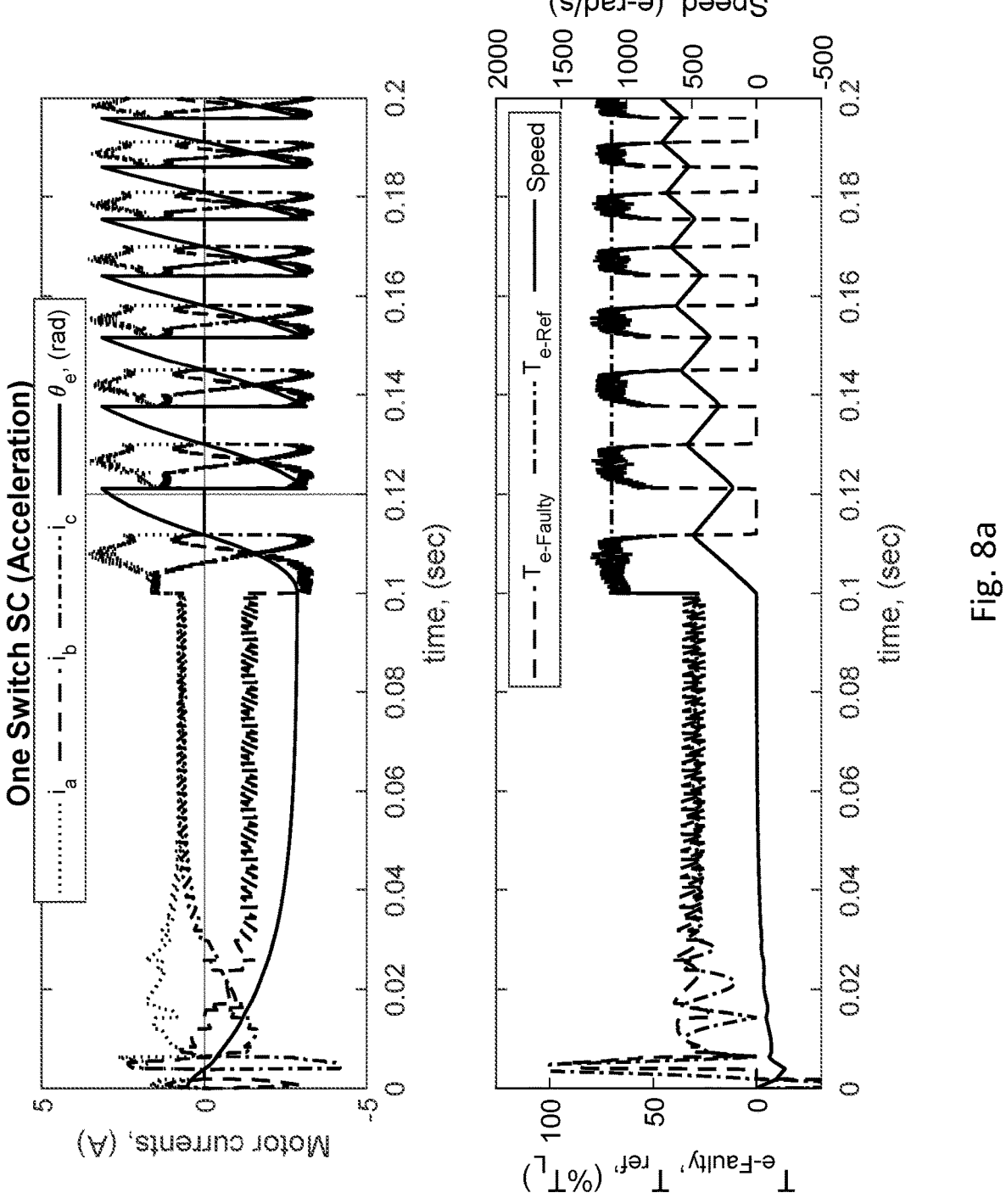
FIGS. 8*a*-8*b* show simulated results of the faulty channel control illustrating the successful starting of a motor by employing the control scheme of the technology described herein.
Figure 8B:
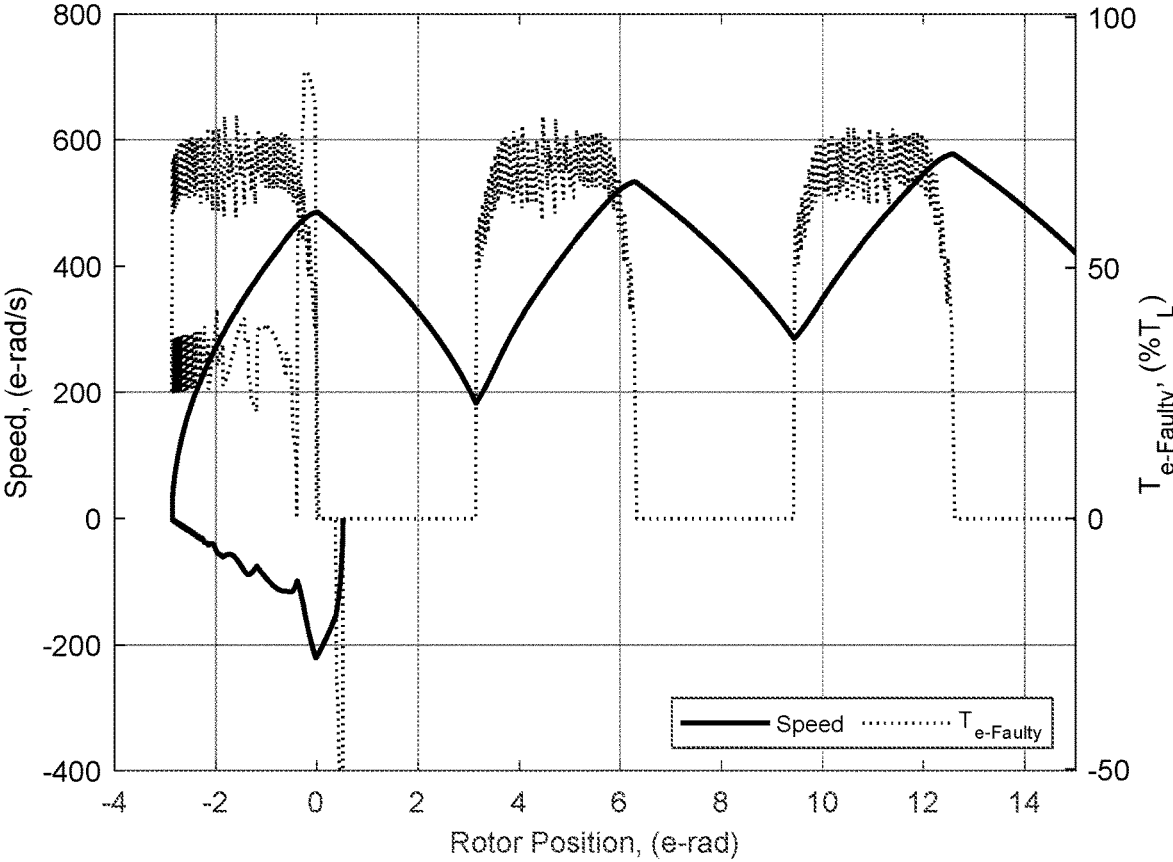

FIG. 8a-8b shows the simulation of the proposed starting strategy of the same motor under an OSSC fault to start that motor from the initial rotor position of 0.55 rad. The rotor position is first controlled to move backwards from 0.55 rad position to a new position equal to –2.6 rad, which is a rotor position that allows the faulty channel to produce assistive torque and which is suitable to accelerate the motor successfully when the healthy and the faulty OSSCFT converters are commanded to produce their nominal torque. As shown in FIG. 8a, the rotor position is controlled to move from the initial position of 0.55 rad at t=0 sec to the new/target position –2.6 rad. The simulation results of FIG. 8a, lower panel show the reaching of the rotor to –2.6 rad at t=0.1 sec. Then, the two channels are operated to start the motor from the new initial rotor position (–2.6 rad). Thus, as shown in FIG. 8b, the motor successfully starts.

Thus, the motor starting strategy of the technology described herein for an OSSC fault of one OSSCFT inverter channel may provide the following benefits compared to other possible approaches:

When starting under nominal load torque the load can be accelerated more quickly.

It can start the motor under overload condition (e.g. of up to approximately 40% overload for the example given above) with no penalties in weight and volume.

It can start the motor where the healthy channel is undersized (e.g. such that torque of the healthy channel is limited to approximately 70% of the nominal load torque for the example given above). The required performance can be maintained under OSSC fault for both acceleration and load requirements.

This then allows reductions in the size and weight of the motor drive system, which is aligned with More Electric Aircraft MEA needs.

It can be used to start the motor when the two channels are under OSSC fault.

While the above examples have been provided primarily with reference to example three-phase inverter topologies, embodiments extend to other configurations of inverter topologies, including but not limited to single-phase topologies (such as 1, 2, 3, 4, etc.—phase topologies) and multiple three-phase topologies (such as 3, 6, 9, etc.—phase topologies). In each case, it will be understood that the number of components such as switches and freewheeling diodes may be varied accordingly.

It will be further understood that while the above embodiments of the technology described herein have been described with reference to a single level inverter that provides power directly to the windings of a motor, the inverter may instead be incorporated into a multi-level system and instead be configured to receive and/or provide AC output current to another or other inverter(s).

Additionally, while the above examples have been provided primarily with reference to example dual channel systems, embodiments of the technology described herein further extend to permanent magnet motor drive systems with different numbers of inverters and/or channels, including but not limited to single channel, dual channel, triple channel, etc. motor drive systems.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A method of operating an electric motor system, wherein the motor system comprises: a motor drive system; and a motor that comprises a rotor having a magnet mounted thereto and a stator that comprises one or more motor phase windings connected to the motor drive system so that the motor drive system can drive rotation of the rotor, wherein the motor drive system comprises two channels, each channel comprising a respective power inverter that can be controlled to provide torque for driving rotation of the rotor, and wherein in the event of a one switch short circuit (OSSC), fault affecting the power inverter in one of the channels, the power inverter in that channel is operable to produce intermittent assistive torque using the remaining switches, the method comprising:

determining that of the channels of the motor drive system has a OSSC fault;

after determining and during a start-up operation of the motor system, wherein the rotor is to be driven from standstill to a continuous rotation:

determining that the initial angular position of the rotor at standstill falls within a range of angles where the channel of the motor drive system that has the OSSC fault can provide assistive torque; and when it is determined that the initial angular position of the rotor does not fall within a range of angles where the channel of the motor drive system that has the OSSC fault can provide assistive torque, moving the rotor so that the angular position of the rotor falls within a range of angles where the channel of the motor drive system that has the OSSC fault can provide assistive torque, and then using both channels to start driving continuous forward rotation of the rotor.

2. The method of claim 1, wherein the moving the rotor so that the angular position of the rotor falls within a range of angles where the channel of the motor drive system that has the OSSC fault can provide assistive torque comprises rotating the rotor backwards from its initial angular position.

3. The method of claim 1, wherein after the start-up operation, once the rotor is continuously rotating at a certain threshold speed, so long as the motor load is less than the nominal torque of the healthy channel, the continued rotation of the rotor is controlled using the healthy channel only, with an open circuit applied to the inverter of the faulty channel.

4. The method of claim 3, wherein once the rotor is continuously rotating at a certain threshold speed, when the motor load is greater than the nominal torque of the healthy channel, the continued rotation of the rotor is controlled using both the healthy channel and the faulty channel, with the faulty channel being operated to provide intermittent assistive torque.

5. The method of claim 1, wherein in order to start up the motor under normal operation conditions, without any OSSC fault, the motor drive system is required to provide a first, nominal torque, and wherein each channel of the motor drive system is sized and arranged to provide less than the first, nominal torque.

6. The method of claim 5, wherein each channel of the motor drive system is sized and arranged to provide between 50-80% of the first, nominal torque that is required in order to start up the motor system under normal operation condition.

7. The method of claim 1, wherein when it is determined that the initial angular position of the rotor does fall within a range of angles where the channel of the motor drive system that has the OSSC fault can provide assistive torque, the method comprises:

using both channels to start driving continuous forward rotation of the rotor from the initial angular position;

wherein the method comprises moving the rotor so that the angular position of the rotor is moved to the start of a range of angles where the channel of the motor drive system that has the OSSC fault can provide assistive torque before using both channels to start driving continuous forward rotation of the rotor.

8. A non-transitory computer program product containing instructions that when executed by a processor perform a method of operating an electric motor system as recited in claim 1.

9. The non-transitory computer program product of claim 8, containing instructions such that the moving the rotor so that the angular position of the rotor falls within a range of angles where the channel of the motor drive system that has the OSSC fault can provide assistive torque comprises rotating the rotor backwards from its initial angular position.

10. The non-transitory computer program product of claim 8, containing instructions such that after the start-up operation, once the rotor is continuously rotating at a certain threshold speed, so long as the motor load is less than the nominal torque of the healthy channel, the continued rotation of the rotor is controlled using the healthy channel only, with an open circuit applied to the inverter of the faulty channel.

11. The non-transitory computer program product of claim 10, containing instructions such that once the rotor is continuously rotating at a certain threshold speed, when the motor load is greater than the nominal torque of the healthy channel, the continued rotation of the rotor is controlled using both the healthy channel and the faulty channel, with the faulty channel being operated to provide intermittent assistive torque.

12. An electric motor system comprising:

a control circuit;

a motor drive system;

a motor that comprises a rotor having a magnet mounted thereto and a stator that comprises one or more motor phase windings connected to the motor drive system to allow the motor drive system to drive rotation of the rotor;

wherein the motor drive system comprises two channels, each channel comprising a respective power inverter that can be controlled to provide torque for driving rotation of the rotor, and wherein in the event of a one switch short circuit (OSSC) fault affecting the power inverter in one of the channels, the power inverter in that channel is operable to produce intermittent assistive torque using the remaining switches;

wherein the electric motor system is configured such that:

when it is determined that one of the channels of the motor drive system has a OSSC fault:

during a start-up operation of the motor system, wherein the rotor is to be driven from standstill to a continuous rotation the control circuit is configured to:

determine whether or not the initial angular position of the rotor at standstill falls within a range of angles where the channel of the motor drive system that has the OSSC fault can provide assistive torque; and when it is determined that the initial angular position of the rotor does not fall within a range of angles where the channel of the motor drive system that has the OSSC fault can provide assistive torque, the control circuit is operable to control the motor drive system to move the rotor so that the angular position of the rotor falls within a range of angles where the channel of the motor drive system that has the OSSC fault can provide assistive torque, and then once the rotor is moved to an angular position where the channel of the motor drive system that has the OSSC fault can provide assistive torque, the control circuit then controls the motor drive system to use both channels to start driving continuous forward rotation of the rotor.

13. The electric motor system of claim 12, wherein the moving the rotor so that the angular position of the rotor falls within a range of angles where the channel of the motor drive system that has the OSSC fault can provide assistive torque comprises rotating the rotor backwards from its initial angular position.

14. The electric motor system of claim 12, wherein after the start-up operation, once the rotor is continuously rotating at a certain threshold speed, so long as the motor load is less than the nominal torque of the healthy channel, the continued rotation of the rotor is controlled using the healthy channel only, with an open circuit applied to the inverter of the faulty channel.

15. The electric motor system of claim 14, wherein once the rotor is continuously rotating at a certain threshold speed, when the motor load is greater than the nominal torque of the healthy channel, the continued rotation of the rotor is controlled using both the healthy channel and the faulty channel, with the faulty channel being operated to provide intermittent assistive torque.

16. The electric motor system of claim 12, wherein in order to start up the motor under normal operation conditions, without any OSSC fault, the motor drive system is required to provide a first, nominal torque, and wherein each channel of the motor drive system is sized and arranged to provide less than the first, nominal torque.

17. The electric motor system of claim 16, wherein each channel of the motor drive system is sized and arranged to provide between 50-80% of the first, nominal torque that is required in order to start up the motor system under normal operation conditions.

18. The electric motor system of claim 12, wherein when it is determined that the initial angular position of the rotor does fall within a range of angles where the channel of the motor drive system that has the OSSC fault can provide assistive torque, the control circuit is configured to use both channels to start driving continuous forward rotation of the rotor from the initial angular position;

wherein the control circuit is configured to move the rotor so that the angular position of the rotor is moved to the start of a range of angles where the channel of the motor drive system that has the OSSC fault can provide assistive torque before using both channels to start driving continuous forward rotation of the rotor.

\* \* \* \* \*